Nov. 10, 1925.
L. B. McCARGAR
FEED MILL
Filed April 14, 1924
1,561,093
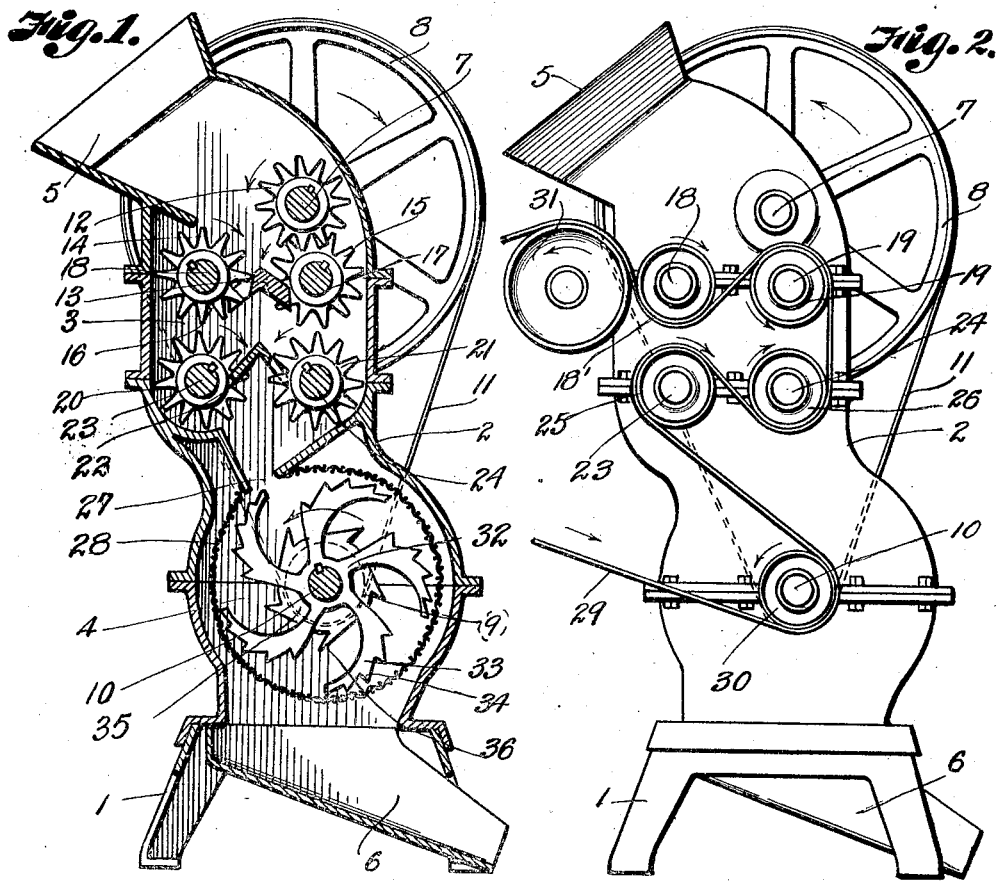
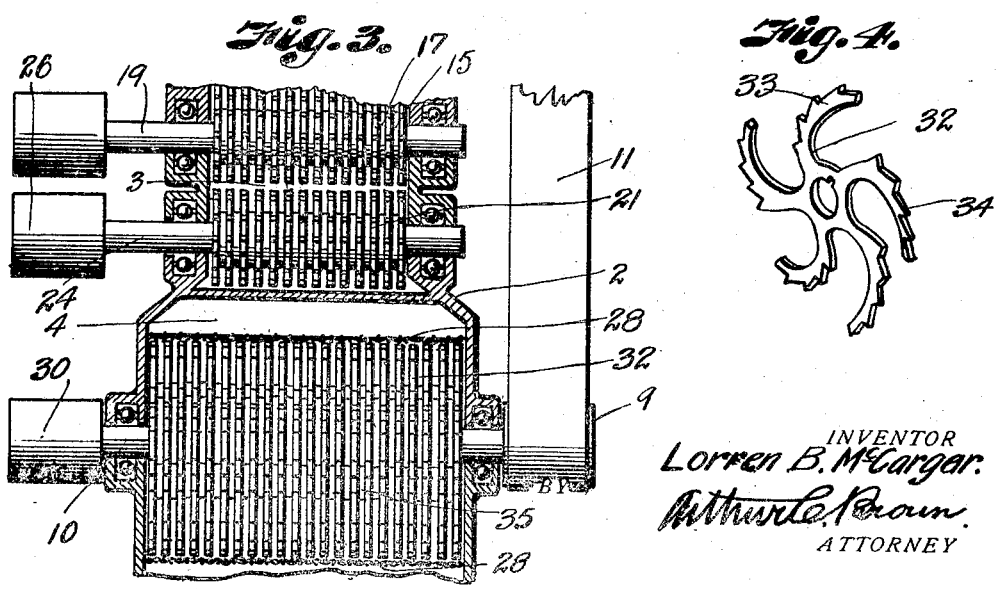
INVENTOR
Lorren B. McCargar.
ATTORNEY Patented Nov. 10, 1925.

1,561,093

UNITED STATES PATENT OFFICE.

LORREN B. McCARGAR, OF KANSAS CITY, MISSOURI.

FEED MILL.

Application filed April 14, 1924. Serial No. 706,344.

*To all whom it may concern:*

Be it known that I, LORREN B. McCARGAR, a citizen of the United States, residing at Kansas City, in the county of Jackson and State of Missouri, have invented certain new and useful Improvements in Feed Mills; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to mills and particularly to feed mills. The primary object of the invention is to provide a simple inexpensive mill which will grind the maximum amount of material in the shortest possible time with the minimum of power.

The novel construction of my invention will be clearly understood by reference to the following description in connection with the accompanying drawings, in which—

Fig. 1 is a vertical longitudinal sectional view through a mill constructed in accordance with my invention.

Fig. 2 is a side elevational view of the mill.

Fig. 3 is an elevational view of the cutting disks, and

Fig. 4 is a detailed perspective view of one of the spiders for forcing the material through a screen.

The mill is provided with a base 1 on which is supported a casing 2. The casing is formed with a grinding chamber 3 and a sub-jacent chamber 4. The upper chamber 3 is formed with a hopper opening 5 into which the material to be treated is fed and the bottom of the sub-jacent chamber or screening chamber 4 is provided with an outlet in the form of a chute 6. In the upper portion of the chamber 3 is a shaft 7 extending through one side wall of the chamber 3. The extending end carries a large pulley 8 driven from a pulley 9 on the end of a shaft 10 in the sub-jacent chamber through the medium of a belt 11. The pulley 9 is much smaller than the pulley 8, so that as the belt 11 travels over the pulleys 8 and 9, the shaft 7 will be driven at a much lower speed than the shaft 10, the reason for providing the speed reduction between the shafts 10 and 7 is that the shaft 7 carries feeding disks 12 provided with teeth which cause the material to be fed upon the V-shaped grid 13 having slots in its edge through which the teeth 14 and 15 of the cutters 16 and 17 project.

The cutters 16 and 17 are mounted on shafts 18 and 19 and they rotate in opposite directions toward the center of the grid 13. Immediately below the cutters 16 and 17 are similar cutters 20 and 21 which co-operate with a V-shaped grid 22, the cutters 20 and 21 being carried by shafts 23 and 24. They extend through the side of the casing and support pulleys 25 and 26. The shafts 23 and 24 rotate so that the cutters which they carry turn in opposite directions toward the center of the casing or the center of the grid 22 and like the cutters 16 and 17 their teeth pass through the comb-like edges of the grid 22.

The bottom of the chamber 3 is provided with a constricted portion or throat 27 through which the material discharges into the cylindrical screen 28 within the subjacent chamber 4. Within the screen and concentric therewith is located the shaft 10 driven by a belt 29 which passes over the pulley 30. The belt not only passes around the pulley 30 but it passes around the pulleys 25, 26, 19' and 18' and over the idler 31 in the order named. The shaft 10 therefore rotates in a counter-clockwise direction, the shaft 23 rotates in a clockwise direction, the shaft 24 rotates in a counter-clockwise direction, the shaft 19 rotates in a counter-clockwise direction, while the shaft 18 rotates in a clockwise direction, the shaft 7 of course rotating in a counter-clockwise direction as does the shaft 10. The shaft 10 carries a spider, best shown in Fig. 4 and designated 32. The spider has a plurality of arcuate arms 33, the outer edges of which are serrated or toothed as at 34. The arc on which the arms 33 are generated is slightly less than the arc of the screen 28, so that as the material enters the screen, the arms 33 will force the material through the meshes of the screen into the chute 6. There are a number of these spiders extending entirely across the width of the machine and alternating with projector disks 35 having fingers 36 which tend to throw the material toward the screen and thereby reduce liability of the material piling up around the shaft 10.

The spiders as well as the projector disks are preferably made relatively thin, so as to obtain the best action on the material to cause it to pass through the screen. The spiders in no wise act as do the hammers in a hammer mill and it is desirable to here make a special point of the fact that the screen is in effect a complete cylinder providing the maximum reticulated wall through which the material can be forced by the spiders or projectors.

The device has materially increased efficiency over an ordinary concave or portion of a cylinder, the area of it would of necessity be fragmentary as compared with a complete cylinder and in so far as I am aware, I am the first to utilize a reticulated cylinder with puller arms or projector arms for forcing material through the cylinder and thereby increasing the output of the mill.

I do not make any special claim to the specific construction of the cutters because they have been used prior to my invention, but I am not aware that prior to my invention, the arrangement as illustrated in this application has ever been provided.

The serrated teeth 34 of the spider will finely divide the material which has been more coarsely separated by the cutters and the forcing actions of the serrated arms through the screen will cause the material to pass into the chute in a uniformly finely divided condition.

Attention is also called to the fact that in order to get the best results, I recommend that the edges of the serrated portions of the arm be relatively sharp so as to have a cutting action on the material and so that the material is sub-divided before it passes through the screens, therefore the arms serve a two-fold purpose, that as cutting elements and also as forcing means for causing the material to pass through the meshes of the screen.

Attention is further called to the fact that with this construction of mill contemplated by my invention it will not be necessary to employ a blower and by dispensing with the blower, the power cost for operating the mill is materially reduced.

What I claim and desire to secure by Letters-Patent is:

1. In a mill, a casing comprising upper and lower chambers, a cylindrical screen in the lower chamber, having a receiving opening at its upper portion, a plurality of arms rotatable within the screen and adapted for forcing material therethrough, cutting means in the upper chamber, and a partition separating the upper and lower chambers having a throat at one side of the arm axis and inclined to deliver material into the screen tangentially to the arms and in the direction of the arms rotation.

2. In a mill, a casing comprising upper and lower chambers, a cylindrical screen in the lower chamber, having a receiving opening at its upper portion, a plurality of spaced groups of beating and cutting arms rotatable within the screen, projector disks separating the arms and rotatable therewith, cutting means in the upper chamber, and a partition separating the chambers, having a throat registering with the receiving opening of the screen.

3. In a mill, a casing comprising upper and lower chambers, a cylindrical screen in the lower chamber, having a receiving opening at its upper portion, a plurality of arms rotatable within the screen and adapted for forcing material therethrough, an inverted V-shaped grid in the upper chamber, having vertical slots in its opposite members, and cutters rotatable downwardly in said slots.

4. In a mill, a casing, vertically spaced, fixed cutter members located in the upper portion of the casing and provided with spaced slots, toothed cutter members rotatable in the slots of the fixed cutter members, a cylindrical screen located in the lower portion of the casing and having an opening at the top through which material is delivered from the upper cutter members, a rotatable shaft concentric with the screen, and spiders on the shaft operable to force material through the screen.

In testimony whereof I affix my signature.

LORREN B. McCARGAR.